(12) United States Patent
Kostushko et al.

(10) Patent No.: US 12,518,037 B2
(45) Date of Patent: Jan. 6, 2026

(54) PROTECTED STORAGE FOR DECRYPTION DATA

(71) Applicant: Acronis International GmbH, Schaffhausen (CH)

(72) Inventors: Alexey Kostushko, Moscow (RU); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 407 days.

(21) Appl. No.: 17/646,280

(22) Filed: Dec. 28, 2021

(65) Prior Publication Data

US 2023/0205908 A1  Jun. 29, 2023

(51) Int. Cl.
| | | |
|---|---|---|
| H04L 29/06 | (2006.01) |
| G06F 21/31 | (2013.01) |
| G06F 21/60 | (2013.01) |
| G06F 21/62 | (2013.01) |
| H04L 67/1097 | (2022.01) |

(52) U.S. Cl.
CPC .......... *G06F 21/6218* (2013.01); *G06F 21/31* (2013.01); *G06F 21/602* (2013.01); *H04L 67/1097* (2013.01)

(58) Field of Classification Search
CPC .... G06F 21/31; G06F 21/602; G06F 21/6218; H04L 67/1097; H04L 63/12
See application file for complete search history.

(56) References Cited

U.S. PATENT DOCUMENTS

| | | | |
|---|---|---|---|
| 9,811,806 B1 * | 11/2017 | Kuang | G06F 16/128 |
| 10,158,483 B1 * | 12/2018 | Newman | G06F 16/27 |
| 10,873,454 B2 * | 12/2020 | Murray | H04L 63/20 |
| 11,055,428 B1 * | 7/2021 | Clerget | G06F 21/6209 |
| 11,126,718 B2 | 9/2021 | Kostyushko et al. | |
| 2015/0154418 A1 * | 6/2015 | Redberg | H04L 63/20 |
| | | | 713/165 |
| 2016/0078245 A1 * | 3/2016 | Amarendran | G06N 20/00 |
| | | | 713/193 |
| 2020/0296089 A1 * | 9/2020 | Hsiung | H04L 63/061 |
| 2022/0198034 A1 * | 6/2022 | Rodriguez | H04L 9/008 |
| 2022/0224743 A1 * | 7/2022 | Nikolai | H04L 65/61 |
| 2022/0382890 A1 * | 12/2022 | Boyapalle | G06F 21/606 |

FOREIGN PATENT DOCUMENTS

| | | | | |
|---|---|---|---|---|
| CN | 112491529 | | 3/2021 | |
| WO | WO2015074745 | * | 5/2015 | ........... H04L 63/045 |

* cited by examiner

*Primary Examiner* — Joseph P Hirl
*Assistant Examiner* — Chi D Nguy
(74) *Attorney, Agent, or Firm* — ESPE Legal Consultancy FZ-LLC

(57) ABSTRACT

Systems and methods for trusted storage of encrypted data onto a cloud storage server are disclosed. The system includes a client device and the cloud storage server. The client device includes a processing unit, a client agent, and a trusted data loading device. The client agent has no access to the network and is implemented within the client device. The client agent receives data and requests to upload the data from the processing unit. The client agent encrypts the data and wraps the data into an encrypted data container.

20 Claims, 4 Drawing Sheets

PROTECTED STORAGE FOR DECRYPTION DATA

TECHNICAL FIELD

The present disclosure generally relates to systems and methods for secured data storage. In particular, the present disclosure relates to systems and methods for trusted data storage on a cloud storage server.

BACKGROUND

With the proliferation of personal computing devices, such as desktop, laptop computers, personal digital assistants (PDAs), smartphones, tablets, and the like, many users have adopted cloud storage services to access their data across the various computing devices. Regardless of the number of devices owned by a user, a cloud storage offers a centralized storage place that can be accessed from all the personal devices belonging to the user. A person skilled in the art would understand that the cloud storage service can be a cluster of one or more cloud servers in distributed form, yet communicatively coupled with each other to offer a single point of data access to the user. The cloud storage cluster is managed and organized by a cloud storage service provider. A user may subscribe for the cloud storage service with the cloud storage provider. Upon login from one or more personal computing devices, the user may store the data at the cloud storage through a single subscription.

The cloud storage service enables the user to upload files to a cloud storage database for data storage in a single remote storage location (i.e., in "the cloud"). Once the service has stored the files in the cloud, the user can access or even synchronize the files from the cloud storage server to local storage on each of the user's computing devices. For complete data privacy, some users may opt for data encryption for their cloud-stored data using data asymmetric encryption algorithms that keep the data secret from the cloud storage service provider. For example, prior to uploading a particular file to the cloud storage server, a user may encrypt the file using an encryption key, known only to the user, on a computing device. Further, upon downloading the encrypted file from the cloud storage server, the user can decrypt the file using the same encryption key on the computing device. With this approach, the cloud storage server never receives or otherwise has access to the user's encryption key or unencrypted data. The cloud storage server only receives and stores the user's encrypted data. Thus, the user can keep cloud-stored data completely private from the cloud storage service provider and other third parties. For instance, employees of the cloud storage service provider cannot view the content of the user's cloud-stored data. Further, if an authority compels the cloud storage service provider to supply the user's cloud-stored data to a third party (e.g., via a legal subpoena), the cloud storage service provider can only supply encrypted data, which the third party would be unable to read.

While the approach above has clear privacy benefits for users, it raises some obvious concerns for the cloud storage service provider. As the cloud storage service provider only receives the encrypted data, without encryption keys, the unascertained nature of the data may complicate it for the cloud storage service provider to store the data. For example, the data could be of the nature that is prohibited by the law. Therefore, many cloud storage service providers may even refuse to store encrypted data. There are numerous data security policies, data access policies, and relevant regulations have been imposed in accordance with different jurisdictions. Abiding by the regulations imposed by the law, the cloud storage service provider may be held responsible for any unsolicited overruling of the law. Therefore, the cloud storage service providers may discourage the user from storing encrypted forms of the data, and rather, may employ a data protection unit to assure the users about the data safety. However, the user may not get an opportunity to conduct a security audit or check the quality of the data protection unit. In that case, the user may not trust the data protection unit and still may insist on storing the encrypted form.

Therefore, a system and method are necessary to present encrypted, yet trustworthy, authenticated, and legitimate data to the cloud storage server for uploading.

SUMMARY

The present disclosure generally relates to systems and methods for data storage. In particular, the present disclosure relates to systems and methods for trusted data storage on cloud storage servers. Due to encryption, the user benefits from secured encrypted data stored on the cloud that can be accessed at any given point without worrying about lost data. Further, the encrypted data is already verified and validated as trustworthy, authenticated, and legitimate. Thus, cloud storage service providers will have few problems storing the encrypted data.

The systems and methods of the present disclosure mainly include a client device and a cloud storage server coupled to the client device. The client device, according to some embodiments, may be a personal computing device of the user. The client device further, may contain a processing unit having a client device database, a client agent, and a trusted data loading device. The processing unit is configured to execute programming instructions received by the client device from the user and retrieve data stored in the client device database. The processing unit may be communicatively coupled to the client agent. The client agent may be configured to receive one or more computer related instructions from the processing unit. In one example, the instructions may include a request for storing data on to the cloud storage server.

A method to store the trusted and encrypted data on to the cloud storage server is disclosed, in accordance with some embodiments.

A first data file and a request to upload the first data file on the cloud storage server is received by the client agent from the processing unit. In alternative embodiments, the client agent is not directly connected to the cloud server and may not have direct access to a cloud storage database.

A set of encryption keys for encrypting data is provided, where a private key is determined by a user and a public key is determined by a data encryption unit. In another implementation, the private as well as public keys are determined by the user. The data encryption unit is configured to receive the first data file, encrypt the first data file using the set of encryption keys, and store the encrypted first data file into an encrypted data container.

A security data label is generated for the encrypted data container containing the first data file by a security data label unit. The security data label is indicative of trusted data encrypted inside, and allows the verification of the data in the encrypted data container. The security data label unit may contain policy storage, and the encrypted data may be verified against policy storage. If the first data file does not fall into prohibited or restricted category, the first data file is labelled as secured and trusted.

The encrypted data container is validated using one or more validation methods. In one implementation, the encrypted data container is validated using the security data label by a trusted data loading unit. The trusted data loading unit validates the encrypted data container to ensure the legitimacy and authenticity of the data to be uploaded. The trusted data loading unit may be coupled to the cloud storage service via a network. As described earlier, the client agent has no direct access to the cloud server. Therefore, the encrypted data container is uploaded to the cloud server via the trusted data loading unit.

The encrypted data container along with the security data label is uploaded on the cloud storage server by the trusted data loading unit. The trusted data loading unit may establish communication via one or more communication protocols.

The encrypted data container is verified using the security data label by a data verification unit of the cloud storage server. The data verification unit may be communicatively coupled to the trusted data loading device to receive the encrypted data container from the trusted data loading unit. Further, the data verification unit may send the encrypted data container, which is verified and trusted, to the cloud storage database.

The encrypted data container is stored in the cloud storage database of the cloud storage server.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

The embodiments will now be described more fully hereinafter with reference to the accompanying figures, in which preferred embodiments are shown. The foregoing may, however, be embodied in many different forms.

To provide an overall understanding of the systems and methods described herein, certain illustrative embodiments will now be described, including systems and methods for storing trusted data at a cloud storage service. However, it will be understood that the systems and methods described herein may be adapted and modified as is appropriate for the application being addressed and that the systems and methods described herein may be employed in other suitable applications, and that such other additions and modifications will not depart from the scope thereof. In particular, a server or system as used in this description may be a single computing device or multiple computing devices working collectively and in which the storage of data and the execution of functions are spread out amongst the various computing devices.

Aspects of the systems and methods described herein provide a system to store verified and trusted encrypted data in cloud storage service. With ever increasing digitalization, digital data generation and storage has been reaching new paramount importance every day. For example, downloaded or clicked pictures, movies, streamed media, digital books, videos, software, software components, binary files, documents, and the like. The user may wish to store this data on a cloud server rather than a personal storage device for obvious reasons, such as limited storage space at the personal devices. Some of the data could be critical and important and must be protected and stored on the cloud server so that it can be retrieved later, even if the user loses his/her/her personal device. The user, in one implementation, may be an individual person accessing the data over a personal computing device, such as a mobile phone or a laptop. In another implementation, the user may be an enterprise with one or more computing systems connected via a network.

A cloud storage system may include one or more servers for providing cloud storage services to users on client devices. For example, a cloud storage system may include a number of data servers for storing a number of files for users of the cloud storage system. The cloud storage system may store a large number of such files in total for a number of users. Files that are stored in the cloud storage system may include word processing documents, spreadsheets, presentations, pictures, music, videos, and a variety of other file formats. The user may use a client device 102 to log into the cloud storage system using a username and password or other login mechanism and access data files owned by the user.

Figure 1:
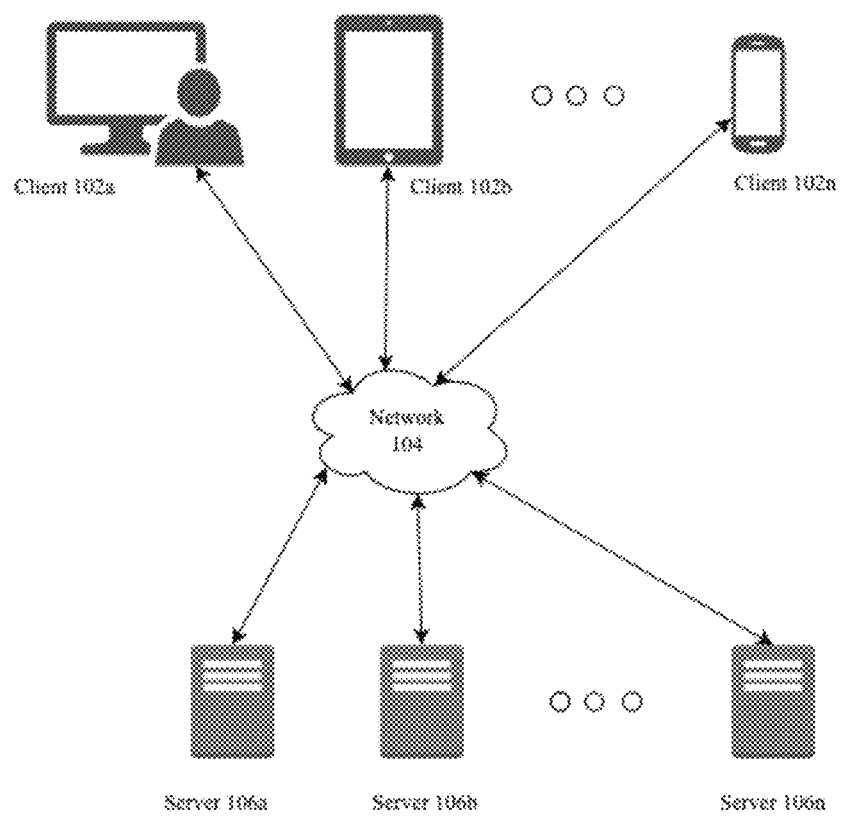
FIG. 1 is a block diagram depicting an embodiment of a network environment comprising client devices in communication with server devices, according to some embodiments.

Prior to discussing specific embodiments of the present solution, it may be helpful to describe aspects of the operating environment as well as associated system components (e.g., hardware elements) in connection with the methods and systems described herein. Referring to FIG. 1, an embodiment of a network environment is depicted. In a brief overview, the network environment includes one or more clients 102a-102n (also generally referred to as local machines(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node(s) 106, machine(s) 106, or remote machine(s) 106) via one or more networks 104. In some embodiments, client 102 has the capacity to function as both a client node seeking access to resources provided by a server and as a server providing access to hosted resources for other clients 102a-102n. In some examples, the client device may comprise different devices, such as PDAs, audio/video devices, mobile phones, MP3 players, laptops, etc.

Although FIG. 1 shows network 104 between clients 102 and the servers 106, clients 102 and servers 106 may be on the same network 104. In some embodiments, there are multiple networks 104 between clients 102 and servers 106. In one of these embodiments, network 104' (not shown) may be a private network and network 104 may be a public network. In another of these embodiments, network 104 may be a private network and a network 104' may be a public network. In still another of these embodiments, networks 104 and 104' may both be private networks.

Network 104 may be connected via wireless links. The wireless links may also include any cellular network standards to communicate among mobile devices, such as 4G, or 5G. The network standards may qualify as one or more generations of mobile telecommunication standards by fulfilling a specification or standards such as the specifications maintained by the International Telecommunication Union. The 4G standards may correspond to the International Mobile Telecommunication Advanced (IMT-Advanced) specification. Examples of cellular network standards include AMPS, GSM, GPRS, UMTS, CDMA2000, CDMA-1×RTT, CDMA-EVDO, LTE, LTE-Advanced, LTE-M1, and Narrowband IoT (NB-IoT). Wireless standards may use various channel access methods, e.g., FDMA, TDMA, CDMA, or SDMA. In some embodiments, different types of data may be transmitted via different links and standards. In other embodiments, the same types of data may be transmitted via different links and standards.

Network 104 may be any type or form of network. The geographical scope of the network may vary widely and network 104 can be a body area network (BAN), a personal area network (PAN), a local-area network (LAN), e.g., Intranet, a metropolitan area network (MAN), a wide area network (WAN), or the Internet. The topology of network 104 may be of any form and may include, e.g., any of the following: point-to-point, bus, star, ring, mesh, or tree. Network 104 may be an overlay network which is virtual and sits on top of one or more layers of other networks 104'. Network 104 may be of any such network topology as known to those ordinarily skilled in the art capable of supporting the operations described herein. Network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv6), or the link layer. Network 104 may be a type of broadcast network, a telecommunications network, a data communication network, or a computer network.

In some embodiments, the system may include multiple, logically grouped servers 106. In one of these embodiments, the logical group of servers may be referred to as a server farm or a machine farm. In another of these embodiments, servers 106 may be geographically dispersed. In other embodiments, a machine farm may be administered as a single entity. In still other embodiments, the machine farm includes a plurality of machine farms. Servers 106 within each machine farm can be heterogeneous—one or more of servers 106 or machines 106 can operate according to one type of operating system platform (e.g., Microsoft Windows), while one or more of the other servers 106 can operate according to another type of operating system platform (e.g., Unix, Linux, or Mac OS).

In one embodiment, servers 106 in the machine farm may be stored in high-density rack systems, along with associated storage systems, and located in an enterprise data center. In the embodiment, consolidating servers 106 in this way may improve system manageability, data security, the physical security of the system, and system performance by locating servers 106 and high-performance storage systems on localized high-performance networks. Centralizing servers 106 and storage systems and coupling them with advanced system management tools allows more efficient use of server resources.

Servers 106 of each machine farm do not need to be physically proximate to another server 106 in the same machine farm. Thus, the group of servers 106 logically grouped as a machine farm may be interconnected using a wide-area network (WAN) connection or a metropolitan-area network (MAN) connection. For example, a machine farm may include servers 106 physically located in different continents or different regions of a continent, country, state, city, campus, or room. Management of the machine farm may be decentralized. For example, one or more servers 106 may comprise components, subsystems, and modules to support one or more management services for the machine farm. In one of these embodiments, one or more servers 106 provide functionality for management of dynamic data, including techniques for handling failover, data replication, and increasing the robustness of the machine farm. Each server 106 may communicate with a persistent store and, in some embodiments, with a dynamic store.

In preferred embodiment, the server may be a cloud storage server implemented in a cloud computing environment. The cloud computing environment may provide client 102 with one or more resources provided by a network environment. The cloud computing environment may include one or more clients 102a-102n, in communication with cloud over one or more networks 104. Clients 102 may include, e.g., thick clients, thin clients, and zero clients. A thick client may provide at least some functionality even when disconnected from cloud or servers 106. A thin client or zero client may depend on the connection to cloud or server 106 to provide functionality. A zero client may depend on cloud or other networks 104 or servers 106 to retrieve operating system data for the client device 102. Cloud may include back-end platforms, e.g., servers 106, storage, server farms or data centers.

Cloud may be public, private, or hybrid. Public clouds may include public servers 106 that are maintained by third parties to clients 102 or the owners of the clients. Servers 106 may be located off-site in remote geographical locations as disclosed above or otherwise. Public clouds may be connected to servers 106 over a public network. Private clouds may include private servers 106 that are physically maintained by clients 102 or owners of clients. Private clouds may be connected to servers 106 over a private network 104. Hybrid clouds 109 may include both the private and public networks 104 and servers 106.

Cloud may also include a cloud-based delivery, e.g., Software as a Service (SaaS) 110, Platform as a Service (PaaS) 112, and Infrastructure as a Service (IaaS) 114. IaaS may refer to a user renting the user of infrastructure resources that are needed during a specified time period. IaaS providers may offer storage, networking, servers, or virtualization resources from large pools, allowing the users to quickly scale up by accessing more resources as needed. PaaS providers may offer functionality provided by IaaS, including, e.g., storage, networking, servers, virtualization, or containerization, as well as additional resources, e.g., the operating system, middleware, or runtime resources. SaaS providers may offer the resources that PaaS provides, including storage, networking, servers, virtualization, operating system, middleware, or runtime resources. In some embodiments, SaaS providers may offer additional resources including, e.g., data and application resources.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over a Hypertext Transfer Protocol (HTTP) and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources using web-based user interfaces, provided by a web browser (e.g., Google Chrome, Microsoft Internet Explorer, or Mozilla Firefox). Clients 102 may also access SaaS resources through smartphone or tablet applications, including Salesforce Sales Cloud, or Google Drive App. Clients 102 may also access SaaS resources through the client operating system, including e.g., Windows file system for Dropbox.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Client 102 and server 106 may be deployed as or executed on any type and form of computing device, e.g., a computer, network device or appliance capable of communicating on any type and form of network and performing the operations described herein.

Figure 2A:
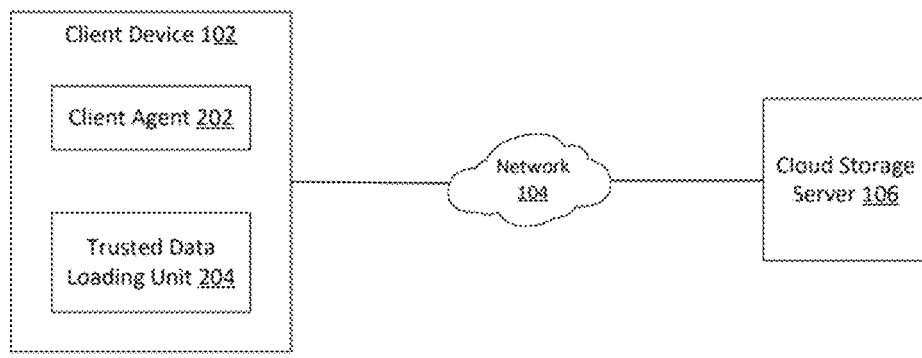
FIG. 2A illustrates one implementation of some of the architecture of system 200 which is implemented by a single client device for data storage on to a cloud storage service, according to some embodiments.

FIG. 2A depicts a general block diagram representing a system for an individual user storing trusted data via a client device 102 on a cloud storage server 106, according to one or more embodiments. As described with reference to FIG. 1, the client device 102 is connected to the cloud storage server 106 via network. Referring back to FIG. 2A, the client device 102 mainly includes a client agent 202 having no access to the network and a trusted data loading device having access to the network. The client agent 202 is implemented to receive data from the client device 102, encrypt the data, label the data as trusted and secured, and share the data with the trusted data loading unit 204. As described earlier, the client agent 202 may not have access to the network. Hence, the client agent 202 itself may not be able to upload the encrypted data onto the cloud storage server 106. Encrypted data, according to some embodiments, has to be validated further. The trusted data loading unit 204 may receive the encrypted data from the client agent 202, validate the data using security data label, and if data is trusted, transmit the trusted data to cloud storage server 106 for data storage.

In this particular embodiment, the user is an individual, having a single personal computing device interacting with the client agent 202, is illustrated. In another implementation, the user is an individual, but may have access to one or more personal computing devices, such as a smartphone, laptop, or desktop computer (not shown in the Figures). In this implementation, the user logs in, through each personal computing device, into a cloud storage service account using the user's security credentials. Once logged in, the user uploads the trusted data onto the cloud storage server 106 through personal computing devices.

Figure 2B:
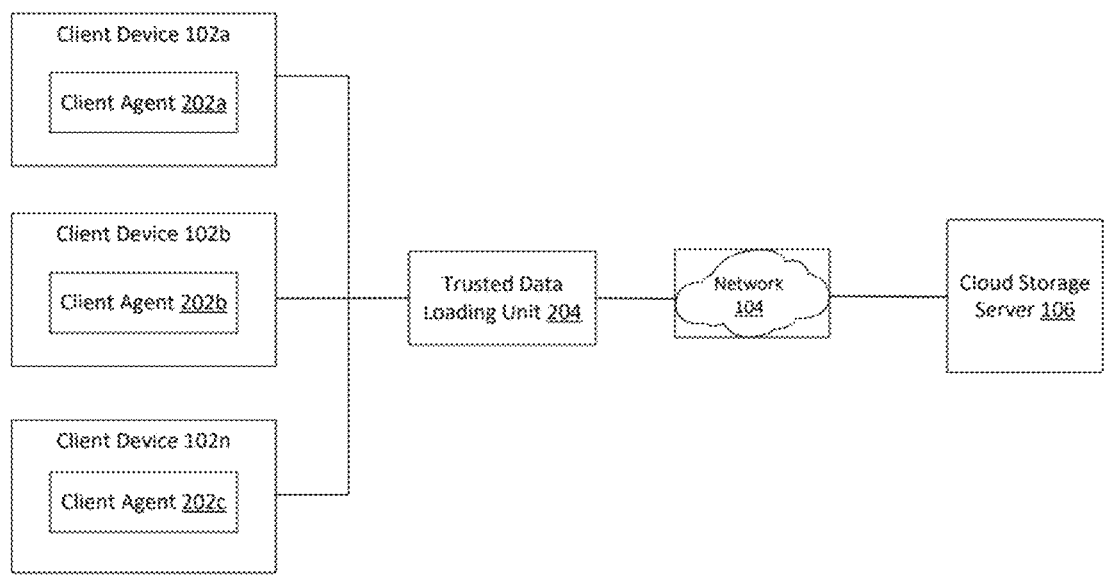
FIG. 2B illustrates another implementation of some of the architecture of system 200 implemented by one or more client devices connected over a network, for data storage on to a cloud storage service, according to some embodiments.

FIG. 2B depicts a general block diagram representing a system including one or more client devices 102*a*, 102*b*, . . . 102*c*, from an enterprise network connected to the cloud storage server 106, according to one or more embodiments. As described with reference to FIG. 1, the client device 102 is connected to the cloud storage server 106 via network. Referring back to FIG. 2B, one or more client devices 102*a*, 102*b*, . . . 102*n*, from enterprise networks may further have been connected with each other via a local network. The enterprise network may share a centralized database to store data associated with each client device 102.

In accordance with some embodiments, each client device 102 from the enterprise network, mainly includes a client agent 202 having no access to the network. A trusted data loading device, having access to the network, may be a single component implemented for the entire enterprise network. For example, if 10 client devices are connected in the enterprise network, one trusted data loading component for the 10 client devices may be implemented. As described in conjunction with FIG. 2A, the client agent 202 is implemented to receive data from the client device 102, encrypt the data, label the data as trusted and secured, and share the data with the trusted data loading unit 204. As described earlier, the client agent 202 may not have access to the network. Hence, the client agent 202 itself may not be able to upload the encrypted data onto the cloud storage server 106. Encrypted data, according to some embodiments, must be validated further. The trusted data loading unit 204 may receive the encrypted data from the client agent 202, validate the data using security data label, and if data is trusted, transmit the trusted data to cloud storage server 106 for data storage. Each component described in conjunction with FIGS. 2A and 2B was more for illustration of the implementation purpose; however, each component is described in detail, exemplary implementations, and preferred embodiments with reference to FIG. 3.

According to one implementation, a user may be an individual accessing a personal computing device (i.e., client device) for personal purposes. In an example, the user may have clicked photos on a smartphone of a private function that took place at home. In this case, the user may wish to store the photos on cloud to keep the memories safe and secured. When stored on the cloud, the user may not have to worry about losing the photos if the smartphone is broken, malfunctioned, or lost. Though beneficial for the data storage, storing the photos on the cloud may impart a threat of embezzlement or exploitation of the photos by third parties (i.e., hackers, malware attackers and such unauthorized users).

In another example, the user may have generated a digital copy of identity related documents issued through an authorized government agency. The documents must be stored somewhere permanently with utmost security and secret from public view. Any possibility of getting the documents public may impart a grave threat of identity theft, identity credentials embezzlement, misuse of the identity related documents, credit card theft, and such deplorable acts. In both examples, the users need a secured place to store the data, i.e., cloud storage server 106, but they may not be guaranteed with the data security.

Figure 3:
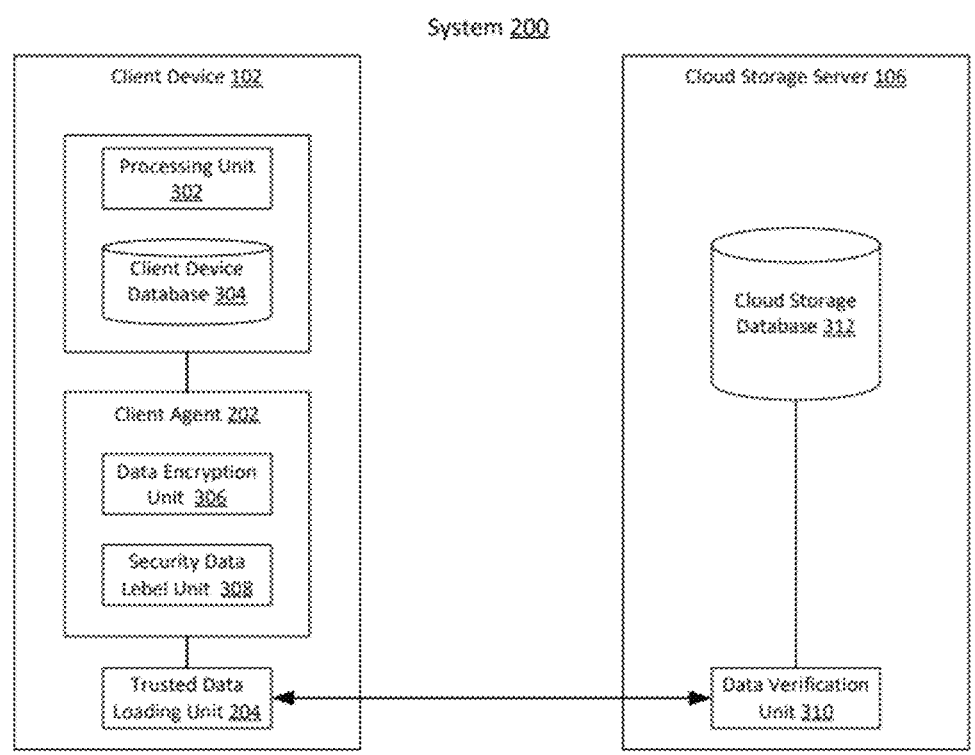
FIG. 3 illustrates one implementation of an architecture of system 200 implemented by the client device connected over a network, for data storage on to a cloud storage service, according to some embodiments.

The system, as described in FIG. 3, provides a secure way to store the data on the cloud storage server 106. According to some embodiments, the client device 102 may include a processing unit 302, a trusted data loading unit 304 coupled to the processing unit 302, the client agent 202 and the trusted data loading unit 204.

In one implementation, the processing unit 302 may be configured to execute one or more computer related instructions and communicate with system components including a trusted data loading unit 304. The processing unit 302 is any logic circuitry that responds to and processes instructions fetched from the main memory unit (not shown in the figure). In many embodiments, the processing unit 302 is provided by a microprocessor unit. The computing device 100 may be based on any of these processors, or any other processor capable of operating as described herein.

In one implementation, the client agent 202 is implemented on the client device 102, communicatively coupled to the processing unit 302, with no access to the network. The client agent 202 may be a software module, part of a software module, or may comprise hardware that generally provides the client device 102 with the ability to communicate with other components within the system, such as a processing unit 302 of the client device 102 and the trusted data loading device. The client agent 202 is configured to receive one or more instructions from the processing unit 302 of the client device 102. An example of the one or more instructions may be a request to perform one or more tasks. In one example, one instruction may be a request to store the data in the cloud storage device made by the user via the processing unit 302. In an example of operation, the client agent 202 receives data and one or more instructions to perform upon the data. The data may be of any size and of any content, where, due to the size (e.g., greater than a few Terabytes), the content (e.g., secure data, etc.), or task(s) (e.g., MIPS intensive). For example, the data may be one or more digital books, a copy of a company's emails, a large-scale Internet search, a video security file, one or more entertainment video files (e.g., television programs, movies, etc.), data files, or any other large amount of data (e.g., greater than a few Terabytes).

According to some embodiments, the client agent 202 may include a data encryption unit 306 and a security data label unit 308. The client agent may not be directly connected to the cloud server, and therefore, may not have direct access to the cloud storage database. The client agent 202 is configured to receive a first data file (i.e., data to be uploaded on to the cloud storage server 106) from the processing unit 302, encrypt the first data file, load the encrypted first data file into a self-encrypted data container, generate a security data label for verification of the encrypted data. In one implementation, the client agent 202 receives a single data file, for example, ABC word document. In another implementation, the client agent 202 receives multiple files of the same file format from a single user. For example, the user may request to upload three video files of different sizes. In yet another implementation, the client agent 202 receives multiple files of different data formats, which may be stored in a single folder, from a single user to be stored at the same location. For example, ABC word document, three videos, and two documents in portable document format (PDF). The client agent 202 is configured to receive data content, regardless of size and format, in accordance with one implementation.

The data encryption unit 306, in accordance with some embodiments, is configured to encrypt the data received by the client agent 202 from the client device 102 to perform encryption. Encryption is one of the effective data security methods used to translate data into another form or code so that the user with a secret key can access the data. Two main types of data encryption are in practice, first, asymmetric encryption, and symmetric encryption.

Symmetric-key ciphers use the same secret key for encrypting and decrypting a message or file. While symmetric-key encryption is much faster than asymmetric encryption, the sender must exchange the encryption key with the recipient before he can decrypt it. As companies find themselves needing to securely distribute and manage huge quantities of keys, one can use an asymmetric algorithm to exchange the secret key after using a symmetric algorithm to encrypt data.

On the other hand, asymmetric cryptography uses two different keys, one public and one private. The public key, as it is named, may be shared with everyone, but the private key must be protected and must be shared only with a data owner.

For example, the Rivest-Sharmir-Adleman (RSA) algorithm is a cryptosystem for public-key encryption that is widely used to secure sensitive data, especially when it is sent over an insecure network like the internet. The RSA algorithm's popularity comes from the fact that both the public and private keys can encrypt a message to assure the confidentiality, integrity, authenticity, and non-reputability of electronic communications and data through the use of digital signatures. Few more examples of encryption algorithms may include, but may not be limited to, the Digital Signature Standard (DSS), which incorporates the Digital Signature Algorithm (DSA), Elliptical Curve Cryptography (ECC), the Diffie-Hellman exchange method, and Secure Sockets Layer (SSL)/Transport Layer Security (TLS) protocol. The encryption algorithm can be applied based on data protection policy. The above examples have been stated only for description purposes, however, any asymmetric algorithm can be implemented by the data encryption unit 306.

Referring to FIG. 3, the data encryption unit 306, in accordance with an embodiment, performs encryption and translates the data, for example the first data file, received from the client device 102 into an encrypted format, using a set of secret keys. In the given example, the user may use a third-party application to generate a set of encryption keys. The set of encryption keys may be loaded to the encryption unit by the user manually. The set of keys may include a private key and a public key, in one implementation. The private key, as the name indicates, may be shared only with the user (i.e., owner of the data). The public key may be shared with other system components. In some embodiments, the encryption key is generated using the key information and one or more of security attributes of the data and authorization policy information defining decryption rights for the data. In some embodiments, the key distributor is an authorization server, which checks the identity of a user who has requested a key. In other embodiments, a separate authorization server may be used to verify the identities of users.

It should be appreciated that the encryption or decryption keys (e.g., key(s)) described above may refer to one or more keys. For example, in some embodiments, a key is used for both encryption and decryption. In some other embodiments, one key is used for encryption and another for decryption. Further, multiple keys, including different versions, may be used for encryption or decryption using one algorithm or multiple different algorithms (e.g., a set of keys for encryption and decryption using one algorithm and another set of keys for encryption or decryption using another algorithm). The appropriate key that is used in the operations described above should be, to one of ordinary skill in the art, apparent from the context.

In some embodiments, the encrypted data, at the data encryption unit 306, may be stored in an encrypted data container. The encrypted data may be wrapped inside the self-encrypted data container and distributed as encrypted content in one implementation. The self-encrypted data containers may have a set of instructions for decrypting the data and updating the data in the encrypted data container. In another implementation, the encrypted data file itself may be referred to as the encrypted data container. The container may include several software components. It may, for example, include user interface logic operable to provide a user interface for a user to unwrap the data from the container. For example, the user interface logic may include tools for various types of key retrieval, e.g., by retrieving a token from the client device 102 and transmitting this to a keystore, or by directly presenting suitable credentials to the remote keystore to recover the key, or by receiving a password in a local user interface and using the password to recover the key that is encrypted and wrapped in the container. Cryptographic tools may also be included in the container so that no additional cryptographic libraries are required on a recipient machine.

The encrypted data container may include meta data labels of the encrypted data. The encrypted data file may contain identifying metadata, such as file name, date and time of generation, name of the organization, name of the computing device that generated the encrypted data, name of the network over which the computing device is connected, and such aspects that can identify the file. The metadata label may be stored inside the encrypted data container for further operations that may be performed after the encrypted data is stored on the cloud. The operations, in a few examples, may be searching of data, integrity checking of the data, and the like.

The encrypted data container may include one encrypted data file, according to one implementation. In another implementation, the encrypted data container may include multiple encrypted data files. The encrypted data container, according to one example, may include first encrypted data file having a first encryption based on at least a part of key information associated with encryption algorithm applied by the data encryption unit 306. Further, the encrypted data container may include a second encrypted data file having a second encryption based on at least a part of said key information associated with encryption algorithm applied by the data encryption unit 306. The second encryption is different to the first encryption. Metadata relating to the first encrypted data file and the second encrypted data file is stored inside the encrypted data container.

In some embodiments, the encryption container may include at least one security attribute, i.e., security data label, pertaining to the contained data, such as a classification label, a time of creation, a location of creation, priority marking, etc. The security data label is generated by the security data label unit 308. The security data label unit 308 is configured to verify the data contained inside the encrypted data container and generate a data label indicative of verified and trusted data being contained inside the encrypted data container, in accordance with one embodiment. The security data label unit 308 may include authorization policies, data protection policies, data safety and security regulations and/or data security related permissions, and the like, based upon which, the security data label unit 308 can determine whether the data encrypted inside the encrypted data container is legitimate and trusted. For example, if encrypted data contains video files with data prohibited by the law for circulation, or the data cannot be trusted and may contain fishing attributes, the security data label unit 308 may not generate the security data label. In another example, if the encrypted data is an album of multiple photos, clicked by the user at a private function or ceremony, then the data can be determined as adhering to the data security policies, and the security data label may be generated by the security data label unit 308 for the encrypted data, in accordance with an embodiment.

In some embodiments, data verification may be performed using one or more data validation methods apart from using security data label unit 308. In one implementation, the data may be verified by controlling operations of the data encryption unit, i.e., by controlling the data access to a file system. In another implementation, the raw data may be encrypted using the same set of encryption keys that has been used to generate the encrypted data container, compared the encrypted data with the encrypted data container, and validated the data by determining whether the encrypted data matches with the encrypted data container. In yet another implementation, the encrypted data container may be decrypted with a private decryption key, compared the decrypted data with the raw data, and validated the data by determining whether the decrypted data matches with the raw data. In above examples, the raw data may be in the original format, i.e., before the encryption process, of the first data file received by the client agent. The examples of validation processes are non-exhaustive; there may be numerous methods that may be implemented for data validation.

The client agent 202, as described, may receive the data from the client device 102, encrypt the data, store the encrypted data in the encrypted data container and generate a security data label for the encrypted data. According to some embodiments, the data protection policy may specify what data can be encrypted automatically. For example, a data file with certain metadata attributes can be considered as a trusted data file. In another example, for certain files, encryption keys may be predefined. Thus, such data, which is defined by the data protection policy, may be encrypted automatically. In accordance with an embodiment, the encrypted data container, along with the security data label, may be sent to the trusted data loading device to verify the encrypted data container and transfer the encrypted data container to the cloud storage server 106.

According to an embodiment, the trusted data loading unit 204 may be configured to support the client agent 202, which is not connected over any network, by verifying the encrypted data and transmitting the verified data to the cloud storage server 106. The verification process may comply with the data security policy, and only reveal information permitted by the client device 102. For example, the trusted data loading may transmit only the verified and trusted encrypted data container along with the security data label. As described with reference to FIGS. 2 and 3, the client agent 202 may not have network access, thereby protecting the encryption process and ensuring encryption and data validation. According to the embodiment, the trusted data loading unit 204 manages communications utilizing one or more network protocols.

Communication between the trusted data loading unit 204 and the data verification unit 310, may be carried out over SSL/TLC as per one implementation. The SSL/TLS is a protocol for performing communication in which the security is requested, in a computer network. The SSL/TLS provides main functions of authenticating a communication partner, encrypting communication data, and detecting falsification. The SSL/TLS is used between a connection-typed transport layer protocol (for example, Transmission Control Protocol (TCP)) and an application layer in many cases and serves as a protocol of a session layer in an OSI reference model. In the SSL/TLS, before the transmission is started, verification of the certificates and exchange of keys are performed between the client device 102 and a cloud storage server 106, and then the encrypted data container along with the security data label is transmitted by the trusted data label unit 308.

The data verification unit 310, according to an embodiment, may be implemented in hardware, firmware, software, or any combination thereof. The data verification unit 310 may be configured to impose a storage policy and verify the security data label pertaining to the encrypted data container, in accordance with the storage policy. In one example, storage operations may be performed according to various storage preferences, for example, as expressed by a user preference or a storage policy. A "storage policy" is generally a data structure or other information source that includes a set of preferences and other storage criteria associated with performing a storage operation. The preferences and storage criteria may include, but are not limited to, a storage location (or a class or quality of storage location), deduplication requirements, relationships between system components, network pathways to utilize in a storage operation, retention policies, data characteristics, compression or encryption requirements, preferred system components to utilize in a storage operation, the estimated or historic usage or cost associated with operating system components, frequency or use/access/etc. various time-related factors, single-instancing or deduplication information, and other criteria relating to a data storage or management operation. As one example, a storage policy may specify that certain data should be stored in one or more cloud storage server 106s, as described herein. In another example, a storage policy may specify that certain data should not be stored in any cloud storage server 106.

In some implementations, a storage policy may comprise an audit policy. An audit policy is a set of preferences, rules or criteria that protect sensitive data in the storage database. For example, an audit policy may define "sensitive objects" as files or objects that contain particular keywords (e.g., "confidential," or "privileged") or are associated with particular keywords or particular flags (e.g., in the security data label identifying a document or email as personal, confidential, etc.). An audit policy may further specify rules for handling sensitive objects. As an example, an audit policy may require that a reviewer approve the transfer of any sensitive objects to a cloud storage database 312, and if approval is denied for a particular sensitive object, the sensitive object may be discarded from the cloud storage server 106.

According to one implementation, the data verification unit 310 may verify content of the security data label pertaining to the encrypted data container against the storage policy to determine whether the data should be stored or not. If the encrypted data container is concluded as trusted and adhering to the storage policy determined by the cloud storage service provider, the encrypted data container may be stored in at least one cloud storage server 106, in accordance with the storage policy. If the encrypted data container is concluded as deceiving and not adhering to the storage policy determined by the cloud storage service provider, the encrypted data container may be discarded.

Upon validation issued by the data verification unit 310, the encrypted data may be stored in a cloud storage database 312 of the cloud storage service. A cloud storage service provider typically provides storage/database and access to data objects as a service provided to end users. Generally, uploading, accessing and manipulation of data stored on a cloud storage site is conducted via an HTTP, FTP, or similar network connection.

It is to be understood that the cloud storage service stores the encrypted data container validated by the data verification unit 310. First, the data is verified by the trusted data loading unit 204 and the container is then transmitted along with the security data label, second, the container has been verified again by the data verification unit 310 against the storage policies. Verification and validation of the encrypted data assures the cloud storage service provider about authenticity and legitimacy of the encrypted data.

Figure 4:
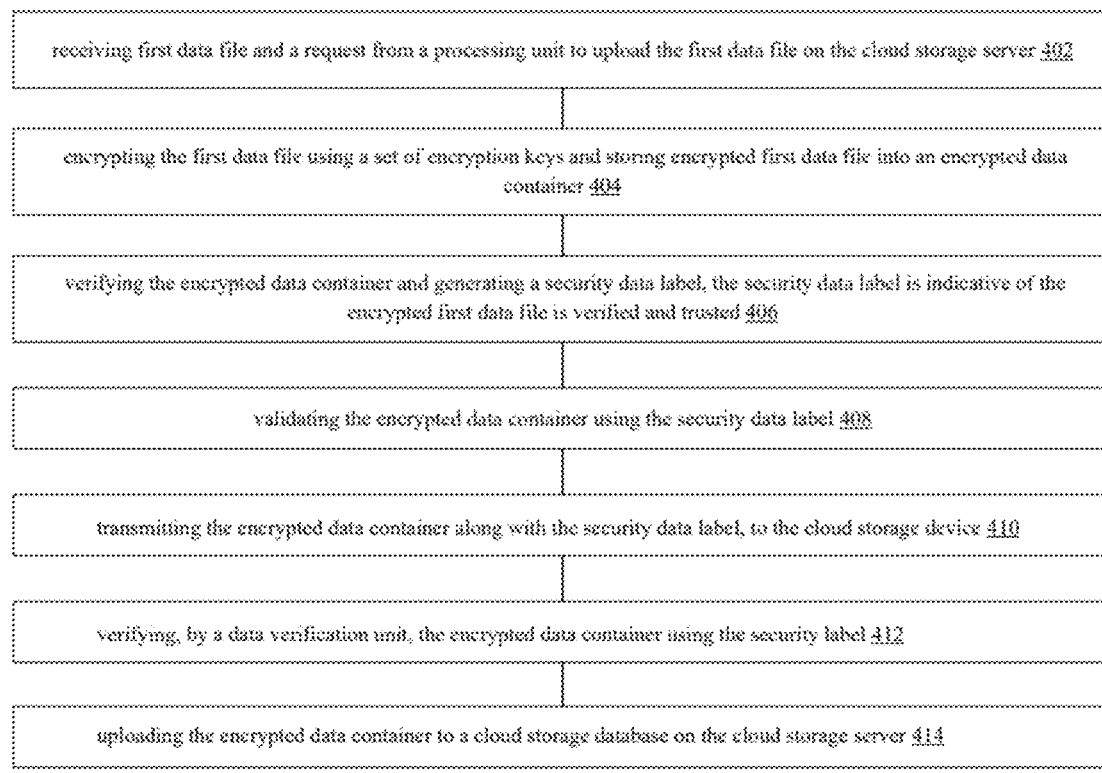
FIG. 4 describes a flow chart for storing trusted data on to the cloud storage server, according to some embodiments.

FIG. 4 describes a method for storing trusted and protected data on to a cloud storage server 106, in accordance with some embodiments. The method includes receiving a first data file and a request, from the processing unit 302, for uploading the first data file on to the cloud storage server 106, encrypting the first data file using the set of encryption keys, verifying the encrypted first data file and wrap it inside an encrypted data container, generating a security data label indicating that the first data file inside the encrypted data container is trusted, validating the data in the encrypted data container using the security data label by the trusted data loading unit 204, transmitting the encrypted data container along with the security data label to the cloud storage device, verifying the encrypted data container using the security label, and storing encrypted data container to a cloud storage device of the cloud storage server 106. At step 402, a first data file and a request to upload the first data file to a cloud storage server 106 is received by a client agent 202. The client agent 202 has no direct access to the cloud storage server 106. The client agent 202 may receive one or more data files from the client device 102 with an uploading request.

At step 404, the first data file is encrypted using a set of encryption keys and stores the first data file into an encrypted data container by the data encryption unit 306. The data encryption unit 306 is configured to receive the first data file and determine the set of encryption keys to be used for encrypting the first data file.

At step 406, a security data label is generated for the encrypted data container containing the first data file by a security data label unit 308. The security data label is indicative of secure encrypted data and allows verification of the data in the encrypted data container. The security data label unit 308 may contain policy storage, and the encrypted data may be verified against policy storage. If the first file does not fall into prohibited or restricted category, the first data file is labelled as secured.

At step 408, the encrypted data container is validated using the security data label by a trusted data loading unit 204. The trusted data loading unit 204 may be coupled to the cloud storage service via a network. The trusted data loading unit 204 verifies the encrypted data container to ensure the legitimacy and authenticity of the data to be uploaded. One or more validation methods may be implemented to validate the encrypted data.

At step 410, the encrypted data container along with the security data label is transmitted on the cloud storage server 106 by the trusted data loading unit 204. The trusted data loading unit 204 may establish communication via one or more communication protocols.

At step 412, the encrypted data container using the security data label is verified by a data verification unit 310 of the cloud storage server 106 by applying a storage policy.

The data verification unit 310 may be communicatively coupled to the trusted data loading device. Further, the data verification unit 310 may send the encrypted data container, verified and trusted, to the cloud storage database 312.

At step 414 the encrypted data container is stored in the cloud storage database 312 of the cloud storage server 106.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

The invention claimed is:

1. A method implemented by a client computing device, for containerizing and sending encrypted data to a cloud storage server, the method comprising:
   receiving, by a client agent, a first data file and a request from a client processing unit to encrypt the first data file and upload the first data file on the cloud storage server, wherein the client agent has no direct access to the cloud server;
   comparing, by a data encryption unit with no direct access to the cloud server, the content of the first data file with a content-based storage policy of the cloud storage server;
   encrypting the first data file, by the data encryption unit, using a set of encryption keys if the first data file meets the requirements of the content-based storage policy of the cloud storage server;
   storing the encrypted first data file in an encrypted data storage container;
   verifying the encrypted data storage container without decrypting the encrypted first data file and generating a security data label, by a data labeling unit, wherein the security data label indicates that the encrypted first data file complies with the storage policy of the cloud storage server; and
   validating, by a trusted data loading unit, the encrypted data storage container;
   transmitting, by the trusted data loading unit, the encrypted data storage container along with the security data label, to the cloud storage server, wherein the encrypted data storage container is configured so that the encrypted first data file cannot be decrypted by the cloud storage server.

2. The method as claimed in claim 1, wherein the client agent is embedded in the client device.

3. The method as claimed in claim 1, wherein the data encryption unit is embedded in the client device.

4. The method as claimed in claim 1, wherein the data labeling unit is embedded in the client device.

5. The method as claimed in claim 1, wherein the data encryption unit and the data labeling unit cannot be modified by the client device.

6. The method as claimed in claim 1, wherein the storage policy comprises an audit policy defining a keyword or a flag.

7. The method as claimed in claim 1, wherein the security data label is locked from modification after generation by the data labeling unit.

8. The method as claimed in claim 1, wherein the client device cannot modify the security data label.

9. A system for storing encrypted data to a cloud storage server without giving the cloud storage server access to the content of the encrypted data, the system comprising:
   a client device comprising:
      a processing unit coupled with a client device storage,
      a client agent configured to receive a first data file and a request to encrypt and upload the first data file on the cloud storage server from the processing unit, wherein the client agent has no access to network;
   wherein the client agent comprises:
      a data encryption unit configured to encrypt the first data file using a set of encryption keys; and wrap the encrypted first data file into an encrypted data storage container;
      wherein the data encryption unit is further configured to encrypt the first data file only if the content of the first data file is consistent with a content-based storage policy of the cloud storage server;
      a data labeling unit configured to verify the encrypted data and generate a security data label indicating that the first data file is consistent with the content-based storage policy of the cloud storage server,
      a trusted data loading unit configured to:
         validate the encrypted data storage container, without decrypting the encrypted data, using the security data label received from the client agent; and
         transmit the encrypted data storage container along with the security data label to the cloud storage server, wherein the encrypted data storage container is configured so that it cannot be decrypted by the cloud storage server.

10. The system as claimed in claim 9, wherein the client agent is embedded in the client device.

11. The system as claimed in claim 10, wherein the data encryption unit is embedded in the client device.

12. The system as claimed in claim 9, wherein the data labeling unit is embedded in the client device.

13. The system as claimed in claim 9, wherein the data encryption unit and the data labeling unit cannot be modified by the client device.

14. The system as claimed in claim 9, wherein one or more of the client device, the data encryption unit, and the data labeling unit are configured by an agent of the cloud storage server.

15. A method for storing verified encrypted data by a cloud storage server without having access to the content of the verified encrypted client data, the method comprising:
   receiving a request from a client agent to store an encrypted data storage container;
   wherein the encrypted data storage container comprises a security data label and an encrypted first data file;
   wherein the first data file has been verified before encryption, by a data encryption unit with no direct access to the cloud storage server, by comparing the content of the first data file with a content-based storage policy of the cloud storage server;
   wherein the security data label has been given by a data labeling unit, and wherein the security data label indicates that the encrypted first data file complies with the content-based storage policy of the cloud storage server;
   wherein the encrypted data storage container has been verified without decrypting the encrypted first data file by a data verification unit, using the security data label; and
   uploading the encrypted data storage container to a cloud storage database on the cloud storage server, wherein the encrypted data storage container cannot be decrypted by the cloud storage server.

16. The method of claim 15, wherein the client agent has been configured by an agent of the cloud storage server.

17. The method of claim 15, wherein the storage policy of the cloud storage server comprises an audit policy defining keywords or flags.

18. The method of claim 15, further comprising creating the storage policy of the cloud storage server by an agent of the cloud storage server before the encrypted data storage container is created.

19. The method as claimed in claim 16, wherein the client agent is updated exclusively by an agent of the cloud storage server.

20. The method of claim 15, wherein the client agent cannot be modified except by an agent of the cloud storage server.

\* \* \* \* \*